US010068346B2

(12) United States Patent
Thiebaud et al.

(10) Patent No.: US 10,068,346 B2
(45) Date of Patent: Sep. 4, 2018

(54) COLOR DISTANCE DETERMINATION

(71) Applicant: THOMSON LICENSING, Issy de Moulineaux (FR)

(72) Inventors: Sylvain Thiebaud, Cesson-Sevigne (FR); Cedric Thebault, Saint Aubin d'Aubigné (FR); Jonathan Kervec, paimpont (FR)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

(21) Appl. No.: 14/994,981

(22) Filed: Jan. 13, 2016

(65) Prior Publication Data
US 2017/0200282 A1    Jul. 13, 2017

(51) Int. Cl.
| G06K 9/34 | (2006.01) |
| G06T 7/40 | (2017.01) |
| H04N 1/60 | (2006.01) |
| G06T 7/00 | (2017.01) |

(52) U.S. Cl.
CPC ............ *G06T 7/408* (2013.01); *G06T 7/0081* (2013.01); *H04N 1/6027* (2013.01); *H04N 1/6075* (2013.01); *G06T 2207/10024* (2013.01)

(58) Field of Classification Search
USPC ...................... 1/1; 345/589, 590; 375/240.02
See application file for complete search history.

(56) References Cited

U.S. PATENT DOCUMENTS

| 7,129,955 | B2 * | 10/2006 | Motomura | ......... G02B 27/1046 345/589 |
| 8,194,095 | B2 * | 6/2012 | Imai | ........................ G09G 5/02 345/590 |
| 8,558,949 | B2 * | 10/2013 | Sato | ....................... H04N 5/145 345/591 |
| 9,111,132 | B2 * | 8/2015 | Aoki | ........................ H04N 1/62 |
| 9,390,348 | B2 * | 7/2016 | Zheng | .................. G06K 9/6276 |
| 2013/0243312 | A1 * | 9/2013 | Sato | ..................... G06T 7/0089 382/164 |
| 2015/0334412 | A1 * | 11/2015 | Stauder | .................. H04N 19/30 375/240.02 |
| 2016/0352975 | A1 * | 12/2016 | Kervec | ................ H04N 1/6027 |

OTHER PUBLICATIONS

G. Sharma, W. Wu, and E. Dalal, "The CIEDE2000 Color-Difference Formula: Implementation Notes, Supplementary Test Data, and Mathematical Observations," Color Res. Appl. 30: pp. 21-30, Feb. 2005.*
Kuroki et al.—"Lossless Coding of Color Quantized Images Based on Pseudo Distance," The 2004 47th IEEE International Midwest Symposium on Circuits and Systems, MWSCAS '04, Jul. 25-28, 2004, Hiroshima, Japan, pp. I-245-I-247.
(Continued)

*Primary Examiner* — Xuemei Chen
(74) *Attorney, Agent, or Firm* — Tutunjian & Bitetto, P.C.

(57) ABSTRACT

A method for evaluating color differences of pixels is provided. The method comprises obtaining color information of a first pixel in a color opponent space obtaining color information of a second pixel in the color opponent space, defining a half-line in the color opponent space based on the color information of the first pixel, and determining distance between color information of the second pixel and half-line in the color opponent space.

10 Claims, 4 Drawing Sheets

(56) References Cited

OTHER PUBLICATIONS

Lee et al.—"Towards a Novel Perceptual Color Difference Metric Using Circular Processing of Hue Components," 2014 IEEE International Conference on Acoustic, Speech and Signal Processing (ICASSP), May 4-9, 2014, Florence, Italy, pp. 166-170.
Pant et al.—"Riemannian Formulation of the CIEDE2000 Color Difference Formula," 18th Color Imaging Conference 2010—Color Science and Engineering Systems, Technologies, and Applications—Proceedings of a meeting Nov. 8-12, 2010, San Antonio, Texas, USA, Society for Imaging Science and Technology (IS&T), pp. 103-108.
Temel et al.—"Image Quality Assessment and Color Difference"—2014 IEEE Global Conference on Signal and Information Processing (GlobalSIP), Atlanta, Georgia, USA, Dec. 3-5, 2014, pp. 970-974.

* cited by examiner

COLOR DISTANCE DETERMINATION

TECHNICAL FIELD

This disclosure pertains to the field of color science and specifically the problem of color groupings used in color saturation de-clipping in intelligent tone mapping operations (ITMO). The disclosure specifically proposes a method for evaluating the distance between two colors in a color opponent space.

BACKGROUND ART

For the declipping process in intelligent tone mapping operations (ITMO), an important operation consists in building clipped regions. These regions are composed of pixels exceeding a threshold value (clipped pixels), where adjacent pixels have similar colors. In others words, the difference of color between these adjacent clipped pixels must be below a threshold. The goal is to process similarly pixels representing a same color by including them in a region.

The difference of color can be expressed by an Euclidian distance in a color opponent space, such as the CIELAB color space. This distance can be computed as the Euclidian distance considering only the chroma in the a*b* plane ($\Delta C$), or considering the chroma and the lightness in the L*a*b* three dimensional space ($\Delta E$). These two metrics can be used to evaluate the difference between two colors perceived by a human being.

Unfortunately, these Euclidian distances are not compliant with the problem to be solved. In case of the declipping algorithm, it is desired to include in a region colors with similar hues, as well as specular areas, which can be completely white. However the $\Delta C$ and $\Delta E$ give a same weight/importance to a difference of chroma or a difference of hue.

By definition, the clipped regions are composed of over-exposed pixels. Some pixels of these regions can be completely over-exposed, up to the clipping (full saturation to maximum pixel value, 255 for 8 bits). In order to include these clipped pixels in the region, a big $\Delta C$ or $\Delta E$ should be accepted. But in this case, pixels with big color difference (big hue difference) would be included in the region too. Thus using these metrics, regions with different colors would be merged together.

This case is illustrated on FIG. 1, where a white pixel $C_W$ (a*=0, b*=0) must be integrated in the same region as $C_1$ for a correct declipping, but where $C_2$ should not (although $\Delta C$ between $C_1$ and $C_W$ is larger than $\Delta C$ between $C_1$ and $C_2$).

The difference of color can be expressed in the CIELAB color space as the angle formed by the hues of the 2 color points in this space ($\Delta H$). This is the metric that is used in the description of the declipping algorithm (Set forth in WO2015113655 and WO20151138881) The main drawback of this angular metric is that the notion of hue angle loses any sense close the origin and has no sense for white pixels (L*max, a*=0, b*=0). Thus for colors with little chroma (i.e. close to the origin in the a*b* plane), noise has a big influence on hue. This means that the hue angle difference is sensitive to noise.

FIG. 1 represents these distances $\Delta C$ and $\Delta H$ as they could be computed in the a*b* plane of the CIELAB color space. In this plane, the white color $C_W$ is located at the origin, and would not be incorporated in the clipped region with these metrics.

This disclosure is closely related to published applications WO2015113655 filed 28 Aug. 2014, entitled "METHOD FOR CONVERTING A SATURATED IMAGE INTO A NON-SATURATED IMAGE" and WO2015113881 filed 21 Jan. 2015 entitled "METHOD FOR CONVERTING A SATURATED IMAGE INTO A NON-SATURATED IMAGE" which are incorporated by reference. Specifically, this invention provides an additional method for evaluating the distance between two colors in color opponent space, such as a CIELAB color space.

SUMMARY OF INVENTION

The present disclosure is directed to techniques to evaluating the difference in color between two or more pixels. In particular, it deals with determining the distance between two colors in a color opponent space such as the CIELAB color space. The disclosed techniques can be used to segment the pixels into regions composed of clipped or saturated pixels having similar colors, close to the origin or at the origin of the a*b* plane. Using these techniques, pixels with similar hues as well as white or almost white pixels composing the over-exposed areas are integrated in the segmented regions. The segmented regions of saturated colors can then be can then be converted to non-saturated.

In one embodiment, a method for evaluating color differences of pixels is provided. The method comprises obtaining color information of a first pixel in a color opponent space, obtaining color information of a second pixel in the color opponent space, defining a half-line in the color opponent space based on the color information of the first pixel, and determining distance between color information of the second pixel and half-line in the color opponent space.

In another embodiment, an apparatus for evaluating color differences of pixels is provided. The apparatus comprises a storage, memory and processor. The storage is for storing image content. The memory for storing data for processing. The processor is in communication with the storage and memory. The processor is configured to the processor configured to obtain color information of a first pixel in a color opponent space, obtain color information of a second pixel in the color opponent space, define a half-line in the color opponent space based on the color information of the first pixel, and determine distance between color information of the second pixel and half-line in the color opponent space.

In another embodiment, a non-transitory computer-readable medium storing computer executable instructions is provided. The instructions are executable to perform a method comprising obtaining color information of a first pixel in a color opponent space obtaining color information of a second pixel in the color opponent space, defining a half-line in the color opponent space based on the color information of the first pixel, and determining distance between color information of the second pixel and half-line in the color opponent space.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The functions of the various elements shown in the figures may be provided through the use of dedicated hardware as well as hardware capable of executing software in association with appropriate software.

Figure 1:
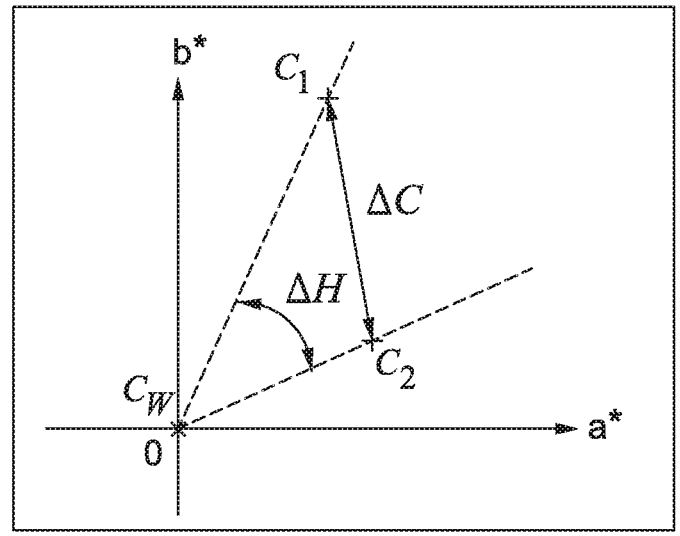
FIG. 1 is a graphical depiction of a previous technique for determining color distance in the CIELAB color space.
Figure 2:
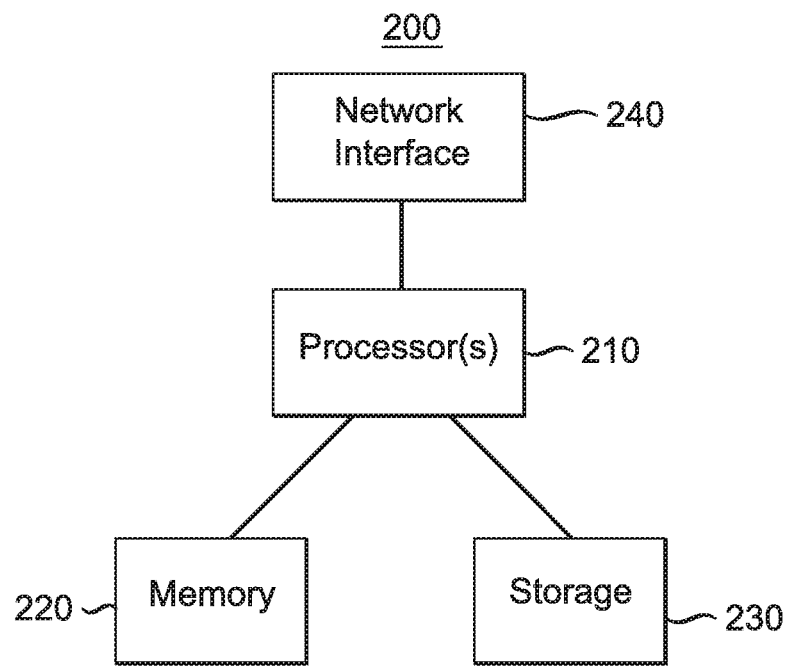
FIG. 2 depicts a block schematic diagram of an electronic device for implementing the methodology of evaluating color distance between colors according to an embodiment.

FIG. 2 depicts an exemplary electronic device 200 that can be used to implement the methodology and system for evaluating color differences of pixels. The electronic device 200 includes one or more processors 210, memory 220, storage 230, and a network interface 240. Each of these elements will be discussed in more detail below.

The processor 210 controls the operation of the electronic device 200. The processor 210 runs the software that operates the electronic device as well as provides the functionality for color distance evaluation set forth in the present disclosure. The processor 210 is connected to memory 220, storage 230, and network interface 240, and handles the transfer and processing of information between these elements. The processor 210 can be general processor or a processor dedicated for a specific functionality. In certain embodiments there can be multiple processors.

The memory 220 is where the instructions and data to be executed by the processor are stored. The memory 220 can include volatile memory (RAM), non-volatile memory (EEPROM), or other suitable media.

The storage 230 is where the data used and produced by the processor in executing the content analysis is stored. The storage may be magnetic media (hard drive), optical media (CD/DVD-Rom), or flash based storage. Other types of suitable storage will be apparent to one skilled in the art given the benefit of this disclosure.

The network interface 240 handles the communication of the electronic device 200 with other devices over a network. Examples of suitable networks include Ethernet networks, Wi-Fi enabled networks, cellular networks, and the like. Other types of suitable networks will be apparent to one skilled in the art given the benefit of the present disclosure.

It should be understood that the elements set forth in FIG. 2 are illustrative. The electronic device 200 can include any number of elements and certain elements can provide part or all of the functionality of other elements. Other possible implementation will be apparent to on skilled in the art given the benefit of the present disclosure.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The disclosed concepts may be notably implemented as a combination of hardware and software. Moreover, the software may be implemented as an application program tangibly embodied on a program storage unit. Such a software can take the form of a plug-in to be integrated to another software. The application program may be uploaded to, and executed by, an image processing device comprising any suitable architecture. Preferably, the image processing device is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit, a display device, a printing unit, and the like. The image processing device implementing the embodiment of the method according to the invention may be part of any electronic device able to receive images, for instance a TV set, a set-top-box, a gateway, a cell phone, a tablet.

Figure 3:
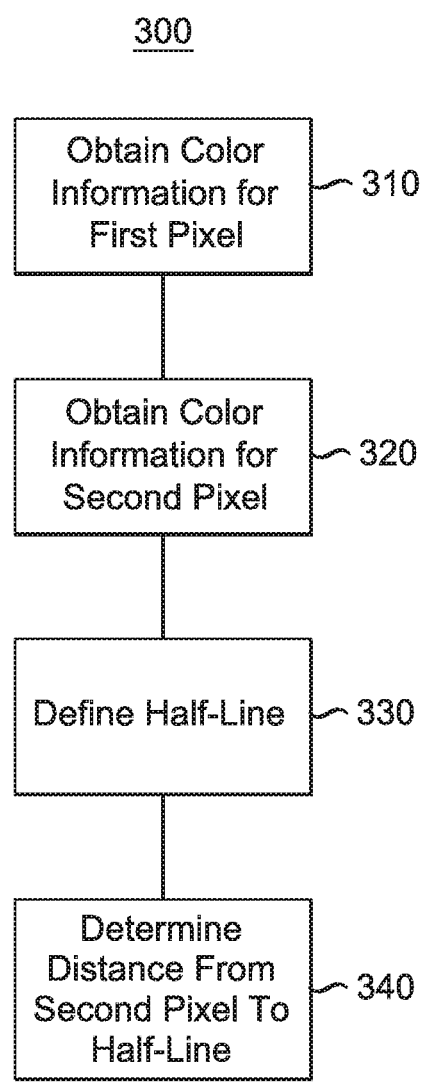
FIG. 3 depicts an exemplary flowchart of a methodology for evaluating color distance between colors according to an embodiment.
Figure 4:
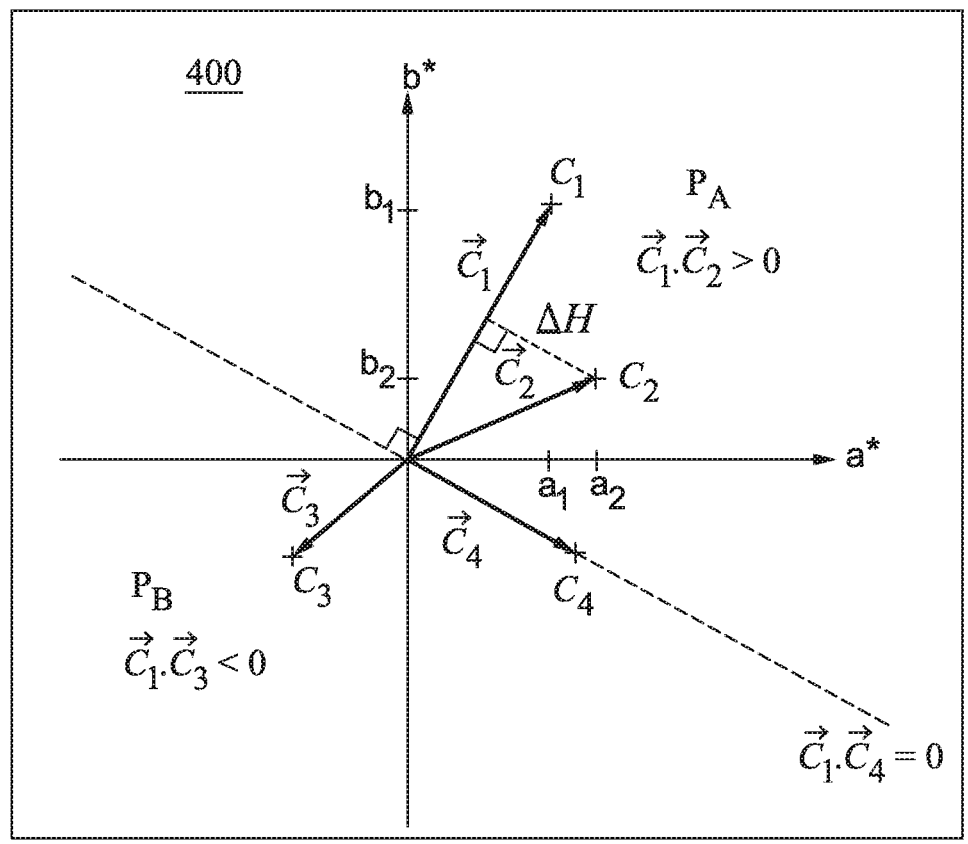
FIG. 4 is a graphical depiction of how color distance is evaluated in accordance with the present disclosure.

FIG. 3 depict a flow diagram 300 of a process for evaluating color differences of pixels in accordance with one embodiment. The flow diagram 300 includes the stages of: obtaining color information of a first pixel in a color opponent space 310, obtaining color information of a second pixel in the color opponent space 320, defining a half-line in the color opponent space based on the color information of the first pixel 330, and determining distance between color information of the second pixel and half-line in the color opponent space 340. Each of these steps will be discussed in more detail below in combination with FIG. 4 depicting the color information of the pixels in a color opposed space 400.

In one such embodiment, $C_i$ is the color of the first pixel $P_i$, defined by its coordinate $(a_i, b_i)$ in the L*a*b* space (Stage 310), and $C_j$ is the color of the second pixel $P_j$, defined by its coordinate $(a_j, b_j)$ in this space (Stage 320).

The color $C_i$ can be represented by the vector $\vec{C}_i$ and the color $C_j$ by the vector $\vec{C}_j$. Refer to FIG. 4, where $C_1$ is an example of color $C_i$, and $C_2$, $C_3$ and $C_4$ three colors $C_j$ in different cases.

To compute or otherwise determine the distance in term of color between first pixel $P_i$ and second pixel $P_j$, the following technique is applied, where the first pixel $P_i$ is chosen as the pixel having the color $C_i$ with a bigger chroma, i.e. further from the origin (a*=0, b*=0) than the second pixel $P_j$ of color $C_j$.

That is to say: or $\|\vec{C}_i\| \geq \|\vec{C}_j\|$ or $\sqrt{a_i^2 + b_i^2} \geq \sqrt{a_j^2 + b_j^2}$ Then we consider the half-line defined by the vector $\vec{C}_i$ (Stage 330)

The hue distance is then determined as the distance between $C_j$ and this half-line (Stage 340).

More precisely:

If $C_j$ is in the ½ plane $P_A$ (for instance $C_2$ on FIG. 4).

That is to say: $\vec{C}_i \cdot \vec{C}_j > 0$ (the scalar product of the 2 vectors is positive, or $a_i \cdot a_j + b_i \cdot b_j > 0$)

Then, the hue distance is the distance between $C_j$ and $\vec{C}_i$ (distance between a point and a line).

That is to say:

$$\Delta H = \frac{|a_i \cdot b_j - b_i \cdot a_j|}{\|\vec{C}_i\|}$$

if $C_j$ is in the ½ plane $P_B$ (for instance $C_3$) or on the line separating $P_A$ and $P_B$ (for instance $C_4$)

That is to say: $\vec{C}_i \cdot \vec{C}_j \leq 0$ (the scalar product of the 2 vectors is negative or null, or $a_i \cdot a_j + b_i \cdot b_j \leq 0$)

Then, the hue distance is the distance of $C_j$ to the origin.

That is to say: $\Delta H = \|\vec{C}_j\|$ or $\Delta H = \sqrt{a_j^2 + b_j^2}$

Figure 5:
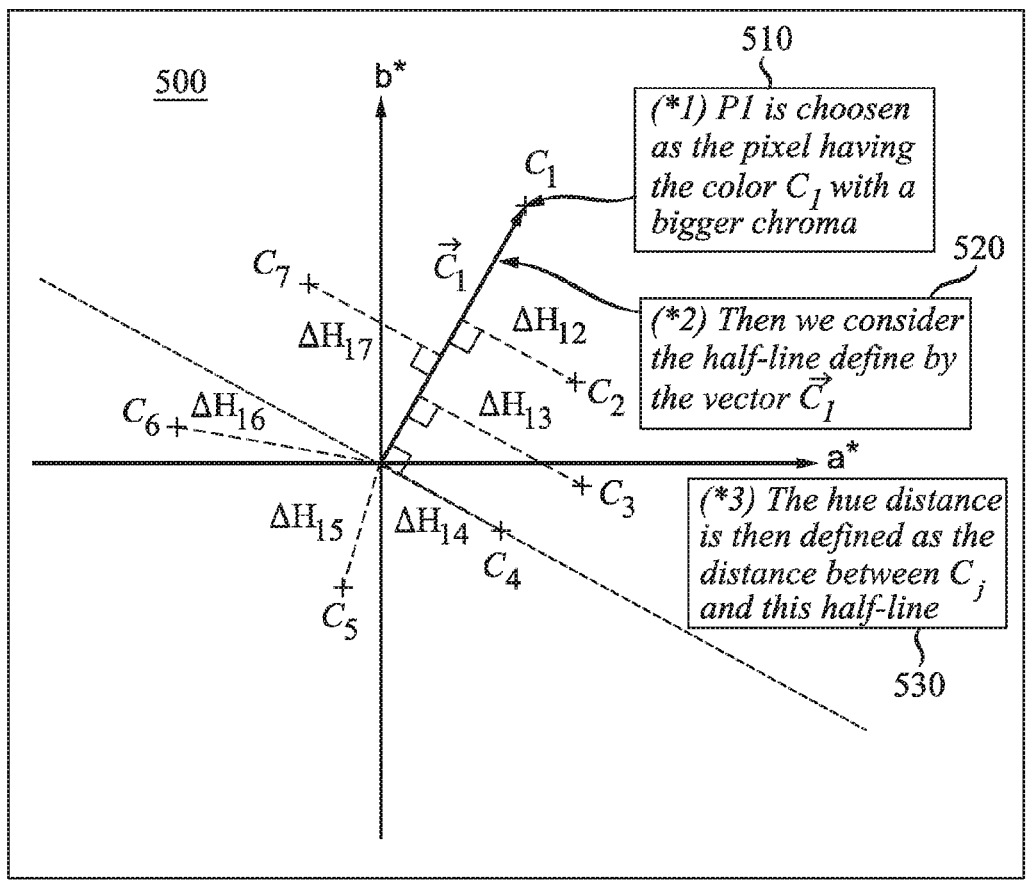
FIG. 5 is another graphical depiction of how color distance is evaluated in accordance with the present disclosure

Another example can be seen in FIG. 5 wherein the color information for the seven pixels ($C_1$-$C_7$) is shown in the CIELAB color space 500. Here, the first pixel P1 is chosen as the pixel with the largest chroma $C_1$ 510. The half-line for the color information of the first pixel is defined as the vector $\vec{C}_1$ 520. The Hue distance $\Delta H$ for each of the other pixels is determined based on the distance from the half-line 530. For example, hue distance $\Delta H_{12}$ is the distance between the second pixel $C_2$ and the half-line defined by vector $\vec{C}_1$. The hue distance $\Delta H_{13}$ is the distance between the second pixel $C_3$ and the half-line defined by vector $\vec{C}_1$. The hue distance $\Delta H_{14}$ is the distance between the second pixel $C_4$ and the half-line defined by vector $\vec{C}_1$. The hue distance $\Delta H_{15}$ is the distance between the second pixel $C_5$ and the half-line defined by vector $\vec{C}_1$. The hue distance $\Delta H_{16}$ is the distance between the second pixel $C_6$ and the half-line defined by vector $\vec{C}_1$. The hue distance $\Delta H_{17}$ is the distance between the second pixel $C_7$ and the half-line defined by vector $\vec{C}_1$.

In these example, the obtained color information for the first and second pixels (as well as the rest of the pixels) was already in a color opposed space, in this case, CIELAB color space. However, in some embodiments the color information may not be in a color opposed space and it may be necessary to convert the color information for the pixels into a color opposed space.

For example, the color information could be provided in the RGB color space. In such a case, the received RGB color coordinates of these colors are, if needed, normalized and optionally linearized in a manner known per se, such that the colors of the received image are represented in the RGB color space of a display device. This RGB color space can be standardized, and the corresponding display device is a virtual one. Then, these colors are converted to a color space separating luminance from chrominance, for instance the CIELAB color space. This conversion of colors from the RGB color space into the CIELAB color space is known per se and therefore not described in detail. Any other color opposed space separating luminance from chrominance can also be used.

Even if this technique is more complicated than the angular or the Euclidian distances, any pixel of color $C_j$, close to the origin or at the origin, is incorporated in the clipped region.

The determined hue distance of the disclosed techniques can be used to segment the pixels into regions composed of clipped or saturated pixels having similar colors, close to the origin or at the origin of the a*b* plane. Using these techniques, pixels with similar hues as well as white or almost white pixels composing the over-exposed areas are integrated in the segmented regions. The segmented regions of saturated colors can then be can then be converted to non-saturated. Such techniques for converting saturated to non-saturated are set forth in published applications WO2015113655 filed 28 Aug. 2014, entitled "METHOD FOR CONVERTING A SATURATED IMAGE INTO A NON-SATURATED IMAGE" and WO2015113881 filed 21 Jan. 2015 entitled "METHOD FOR CONVERTING A SATURATED IMAGE INTO A NON-SATURATED IMAGE" which are incorporated by reference.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. A method comprising:
calculating one or more respective hue distances between a first color associated with a first pixel of an image and one or more other colors associated with one or ore other pixels of the image;
wherein the first color and the one or more other colors are represented within a color opponent space defined by an ab-plane; and
wherein the hue distance between the first color and a given one of the one or more other colors in the color opponent space is calculated as:

if $\vec{C}_i \cdot \vec{C}_j > 0$, then $$\frac{|a_i \cdot b_j - b_i \cdot a_j|}{\|\overline{c_j}\|} = \Delta H,$$

and if $\vec{C}_i \cdot \vec{C}_j \leq 0$, then $\|\vec{C}_j\| = \Delta H$, where $\Delta H$ is the hue distance, $\vec{C}_i$ is a color vector having coordinates $a_i$ and $b_i$ corresponding to a location of the first color in the ab-plane, and $\vec{C}_j$ is a color vector having coordinates $a_j$ and $b_j$ corresponding to a location of the given other color in the ab-plane; and defining a pixel region around the first pixel based on the one or more hue distances, wherein the pixel region comprises those of the one or more other pixels having other colors corresponding to hue distances less than or equal to a hue distance threshold.

2. The method according to claim 1, wherein the first color has a larger chrominance than each of the one or more other colors.

3. The method according to claim 1, wherein the first pixel is an overexposed pixel.

4. The method according to claim 3, further comprising converting the colors of the pixels of the pixel region such that the first color is non-saturated.

5. A method comprising:
calculating one or more respective hue distances between a first color associated with a first pixel of an image and one or more other colors associated with one or more other pixels of the image;
wherein the first pixel is an overexposed pixel;
wherein the first color and the one or more other colors are represented within a color opponent space defined by an ab-plane; and wherein the hue distance between the first color and a given one of the one or more other colors in the color opponent space is calculated as:

if $\vec{C}_i \cdot \vec{C}_j > 0$, then $$\frac{|a_i \cdot b_j - b_i \cdot a_j|}{\|\vec{c}_j\|} = \Delta H,$$

and if $\vec{C}_i \cdot \vec{C}_j \leq 0$, then $\|\vec{C}_j\| = \Delta H$, where
$\Delta H$ is the hue distance, $\vec{C}_i$ is a color vector having coordinates $a_i$ and $b_i$ corresponding to a location of the first color in the ab-plane, and $\vec{C}_j$ is a color vector having coordinates $a_j$ and $b_j$ corresponding to a location of the given other color in the ab-plane;

defining a pixel region around the first pixel based on the one or more hue distances, wherein the pixel region comprises those of the one or more other pixels having other colors corresponding to hue distances less than or equal to a hue distance threshold; and converting the colors of the pixels of the pixel region such that the first color is non-saturated.

6. The method according to claim 5, wherein the first color has a larger chrominance than each of the one or more other colors.

7. An apparatus comprising:
a processor; and
a memory coupled to the processor that stores instructions when executed by the processor configure the processor to:
calculate one or more respective hue distances between a first color associated with a first pixel of an image and one or more other colors associated with one or more other pixels of the image;

wherein the first color and the one or more other colors are represented within a color opponent space defined by an ab-plane; and wherein the hue distance between the first color and a given one of the one or more other colors in the color opponent space is calculated as:

if $\vec{C}_i \cdot \vec{C}_j > 0$, then $$\frac{|a_i \cdot b_j - b_i \cdot a_j|}{\|\vec{c}_j\|} = \Delta H,$$

and if $\vec{C}_i \cdot \vec{C}_j \leq 0$, then $\|\vec{C}_j\| = \Delta H$, where
$\Delta H$ is the hue distance, $\vec{C}_i$ is a color vector having coordinates $a_i$ and $b_i$ corresponding to a location of the first color in the ab-plane, and $\vec{C}_j$ is a color vector having coordinates $a_j$ and $b_j$ corresponding to a location of the given other color in the ab-plane; and define a pixel region around the first pixel based on the one or more hue distances, wherein the pixel region comprises those of the one or more other pixels having other colors corresponding to hue distances less than or equal to a hue distance threshold.

8. The apparatus according to claim 7, wherein the first color has a larger chrominance than each of the one or more other colors.

9. The method according to claim 7, wherein the first pixel is an overexposed pixel.

10. The apparatus according to claim 9, wherein the memory stores further instructions that when executed by the processor further configure the processor to convert the colors of the pixels of the pixel region such that the first color is non-saturated.

* * * * *